United States Patent [19]

Slocum

[11] 3,925,748

[45] Dec. 9, 1975

[54] RESISTANCE DEVICE FOR USE IN ENERGIZING THE STARTING WINDING OF A SPLIT PHASE INDUCTION MOTOR

[75] Inventor: Charles W. Slocum, Spring Lake Heights, N.J.

[73] Assignee: Thermo-Electronics, Inc., Allenwood, N.J.

[22] Filed: Nov. 8, 1973

[21] Appl. No.: 413,839

[52] U.S. Cl. ............... 338/57; 174/52 R; 310/68 C; 338/220; 338/232; 338/316; 318/471
[51] Int. Cl.² ............................................. H01C 1/02
[58] Field of Search ........ 318/229, 221 E, 471–473; 310/68, 68 C, 67, 72; 338/22, 25, 234, 252, 276, 322, 220, 22 R, 57, 232, 316; 174/52 R

[56] References Cited
UNITED STATES PATENTS
3,842,188    10/1974    Petersen............................ 174/52 R

*Primary Examiner*—J. D. Miller
*Assistant Examiner*—Robert J. Hickey

[57] ABSTRACT

A resistance device for a split phase induction motor having a main field winding and a starting field winding, said device having a high temperature coefficient resistor adapted to be connected in series with the starting field winding. The device is in the form of a unitary structure and is provided with a set of terminals whereby it may be removably connected to an electrical connector provided on the motor.

11 Claims, 12 Drawing Figures

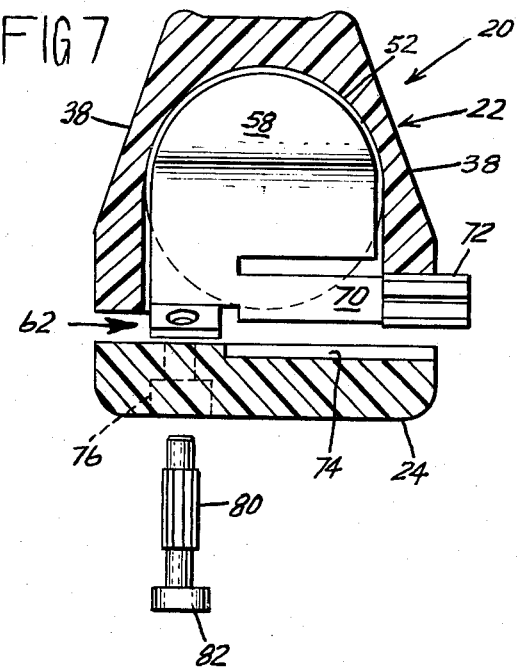
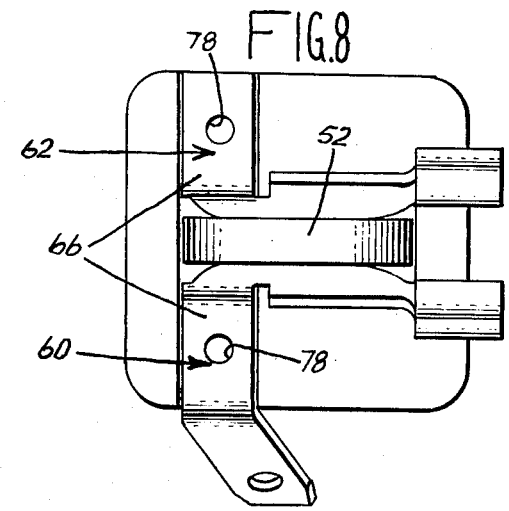
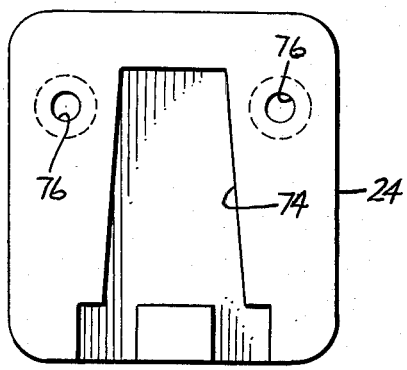
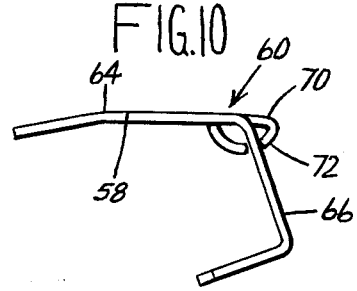
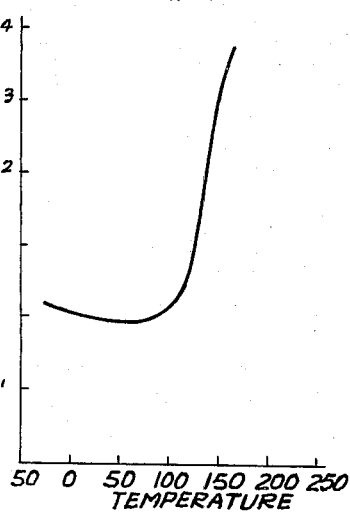
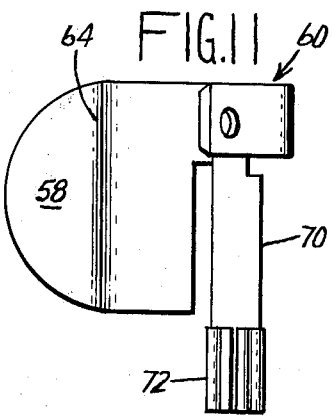
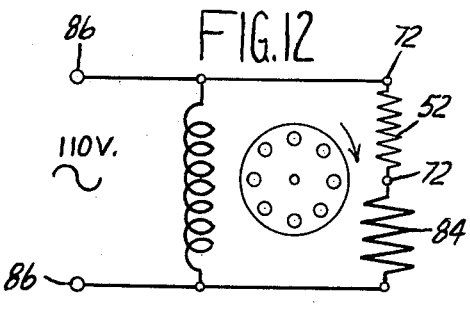

3,925,748

RESISTANCE DEVICE FOR USE IN ENERGIZING THE STARTING WINDING OF A SPLIT PHASE INDUCTION MOTOR

BACKGROUND OF THE INVENTION

1. Field of the Invention

This invention relates generally to a resistance device for use in the starting winding circuit of conventional split phase induction motor, and more particularly to such a device employing a high temperature coefficient resistor adapted to be series connected with the starting winding and to cause energization of the starting winding when the resistor is unheated and de-energization of the winding when heated by starting current flowing therethrough.

2. Description of the Prior Art

Single phase, alternating current induction motors of the distributed winding type conventionally include a main field winding and a starting field winding, the two windings being angularly displaced on a stator core and being energized, respectively, by phase-displaced currents in order to provide starting torque. In one form of single phase induction motors, referred to as resistance-split, the starting winding has a higher resistance than the main winding and may have additional resistance connected in series therewith, the difference in the resistance of the respective main and starting winding circuits providing the requisite phase-displacement. Such additional resistance has previously included a high temperature coefficient resistor having relatively low resistance during periods of starting but higher resistance a short time later due to the self-generated heat in the resistor. Such resistors are commonly referred to as positive temperature coefficient resistors and normally increase in resistance many times upon the heating thereof. Such increased resistance is effective in reducing the current through the starting winding to a low level at which the starting winding is effectively cut out of the motor circuit, the small current drawn being adequate to maintain the high resistance temperature of the resistor.

SUMMARY OF THE INVENTION

In accordance with the broader aspects of this invention, there is provided for use in selectively energizing the starting field winding of a split phase induction motor, a positive temperature coefficient resistance device adapted to be series connected with the starting winding. This device includes a housing of insulating material having a retaining cavity, a high temperature coefficient resistor disposed in said cavity provided with two extended area contact surfaces. The housing has at least one window communicating with the cavity in registry with one of the contact surfaces, this window being relatively large to assist in dissipation of heat from the resistor. Two contact elements are removably mounted in the housing in conductive engagement with the contact surfaces, respectively, the contact elements each including a resilient contact pad having an extended area contact surface resiliently engageable with an extended area of a respective resistor contact surface, and a terminal which projects beyond the housing. The area of contact between the contact surfaces of both the resistor and said pads provides an area current-conducting path therebetween. In one form of the invention, the terminals are in the form of sockets to receive the pins of a male type connector mounted on a motor to which this resistance device is to be connected.

It is an object of this invention to provide a resistance device for use in energizing the starting winding of a split phase induction motor.

It is another object to provide a unitary resistance device which may be conveniently removably connected to the starting winding terminals of a split phase motor.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings.

FIG. 7 is a cross section of a partially assembled and exploded view of the embodiment of FIG. 6 taken essentially along the section line 7—7 of FIG. 6 but showing one contact element in full line form;

FIG. 8 is a bottom perspective view of the embodiment of FIGS. 6 and 7 with the cover plate removed;

FIG. 9 is a plan view of the side of the cover plate that abuts against the housing part of FIGS. 1 and 3;

FIG. 10 is a side view of one of the contact elements shown in FIGS. 6, 7 and 8;

FIG. 11 is a plan view thereof;

FIG. 12 is a typical circuit diagram of an induction motor in which the resistance device of this invention is connected; and FIG. 13 is a graph of temperature versus resistance change characteristics of the positive temperature coefficient resistor used in the device of FIGS. 6, 7, and 8.

Figure 1:
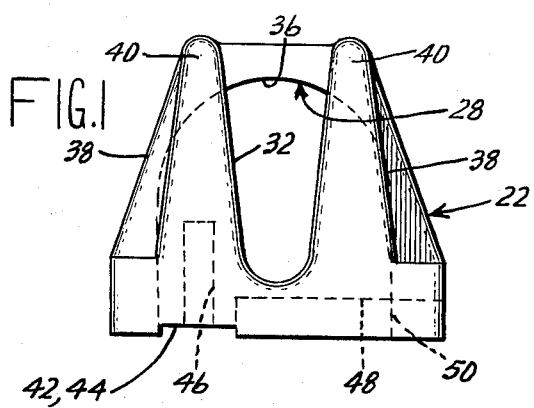
FIG. 1 is a side view of one housing part of an embodiment of this invention.
Figure 2:
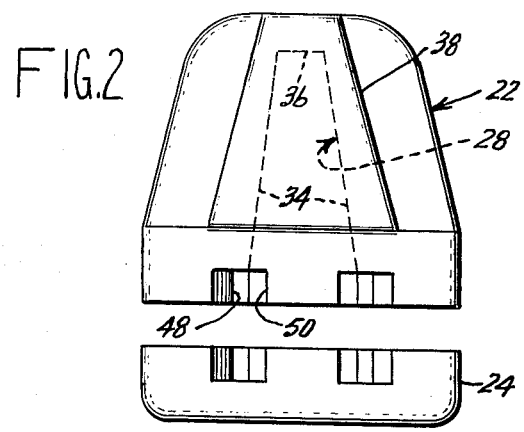
FIG. 2 is an end view of this housing part and a cover plate adapted to be secured thereto, this cover plate constituting another housing part.

Referring to the drawings, and more particularly to FIGS. 1 through 5 and 9, a housing 20 is shown to be of essentially two parts, an upper part 22 and a lower part or cover plate 24. This housing is preferably formed of an insulating material such as a high temperature phenolic resin in molded form. The part 22 is essentially a five-sided enclosure having a bottom 26 and an internal cavity 28 which opens through the bottom 26 in the form of a rectangle 30 shown more clearly in FIG. 3. The housing part 22 is also provided with two openings 32 in the opposite sides thereof in registry with the cavity 28. The cavity 28 is slot-like in shape with the flat opposed walls 34 diverging toward the bottom 26 from the circular portion 36 adjacent the top of the housing part 22. The outer end walls 38 of the housing part 22 are angled as shown and the side walls are in the form of four outwardly projecting ribs 40 as shown which straddle the openings 32.

Figure 3:
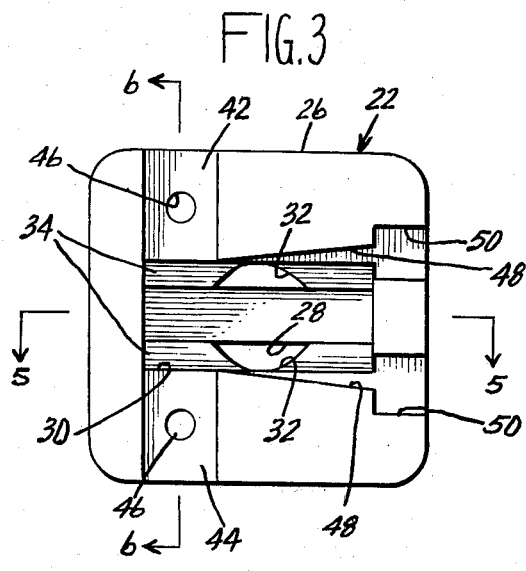
FIG. 3 is a bottom view of the housing part of FIG. 1.
Figure 4:
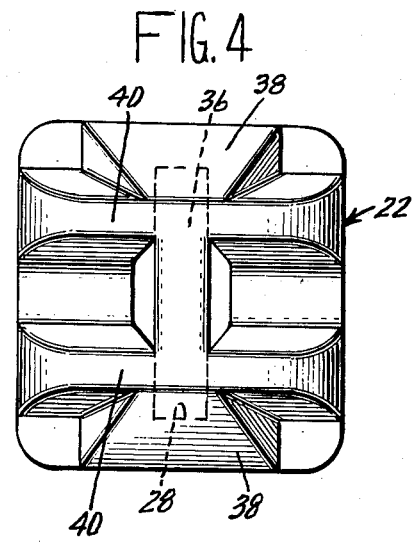
FIG. 4 is a top view thereof.
Figure 5:
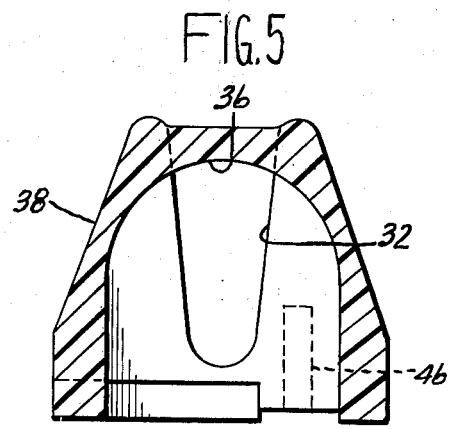
FIG. 5 is a cross section taken substantially along section line 5—5 of FIG. 3.

Two in line rectangular notches 42 and 44 are provided in the bottom 26 transversely thereof with suitable fastener bores 46 in the body opening therethrough. Also formed in the bottom 26 are two spaced apart and essentially parallel channels 48 extending at right angles to the notches 42, 44, these channels communicating with the bottom portion of the cavity 28 along the longitudinal edges of opening 30 as shown in FIG. 3. The right-hand ends of these channels 48, FIG. 3, open into rectangular recesses 50.

Figure 6:
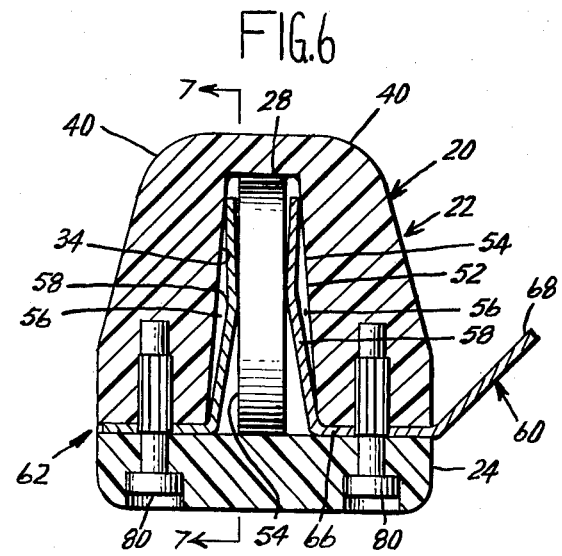
FIG. 6 is a cross section taken substantially along section line 6—6 of FIG. 3 of a fully assembled embodiment of this invention.

As shown more clearly in FIGS. 6, 7 and 8, a disc shaped resistor 52 is disposed in the cavity 28 and nested in the upper portion 36 thereof. The disc 52 has the same radius as the curved portion 36.

This resistor 52 is of the positive temperature coefficient type conventionally used in connection with split phase motors and has a relatively low resistance at room temperature but higher resistance at the higher temperatures produced from heating with the passage of current therethrough. The two sides of the disc 52 are defined by flat parallel surfaces 54 that are suitably coated with a layer of high conductivity contact material, such as silver.

By reason of the divergent walls 34 of the cavity 28, wedge-shaped spaces 56 are provided on each side of the disc 52. Into these spaces 56 are inserted relatively large area, semi-circular contact pads 58 (See also FIGS. 7, 10 and 11), which are wedged between the walls 34 and the respective surfaces 54 for the purpose of making electrical connections to the disc 52, these pads 58 being part of two integrally formed spring metal contact elements generally indicated by the numerals 60 and 62, respectively. These contact elements are described more particularly in connection with FIGS. 10 and 11.

Each pad 58 has a slight angle bend, for example ten degrees, forming a vaguely defined corner 64 which serves as the contact portion for engagement with the surfaces 54 (FIG. 6) of the disc 52. This contact portion 64 has a relatively large radius so as to contact an extended area portion of the disc side 54 for a purpose which will become apparent from the description that follows.

The spaces 56 (FIG. 6) and the size and angulation of the pads 58 are such that insertion of the pads preferably will result in the wedging thereof between the respective cavity walls 34 and the disc surfaces 54. This places the contact ridges 64 into intimate electrical contact with the surfaces 54 over extended areas with the upper pad ends being engaged with the cavity walls 34.

However, the pads 58 may be otherwise shaped so as to bring the ridges 64 into contact with the disc 52 even though the upper ends of the pads 58 may not engage the cavity walls 34 as will become apparent from the description that follows.

The contact elements 60 further are provided with laterally extending lugs 66 preformed to the angle shown in FIG. 10 shaped to conform to the notches 42 and 44 in the bottom of the housing part 22. The contact element 60 is further provided with an outwardly projecting terminal 68 adapted to be connected to a part of the motor circuitry.

Additionally, each contact element 60, 62 is provided with an elongated terminal support 70 that fits into a respective channel 48, (FIG. 3) in the bottom of the housing part 22. Each terminal support 70 is provided with a resilient socket type connector 72 sized to fit into the respective rectangular recess 50 but to project beyond the housing as shown in FIG. 7.

The disc 52 and the two contact elements 60 and 62 are retained in the cavity 28 by the cover plate 24 suitably secured to the underside 26 of the housing part 22.

This cover plate 24, also of plastic, is generally flat but formed with a recess 74 configured as shown in FIG. 9. Generally, this recess 24 conforms to the outline of the opposed outer edges of the two channels 48 and the recesses 50 so as to receive therein the projecting portions (FIG. 7) of the terminal supports 70 and sockets 72. Two holes 76 in the plate 24 are disposed in registry with the bores 46 (FIG. 3) in the housing part 22 as are holes 78 in the lugs 66 of the contact elements 60, 62.

Two suitable drive studs 80 (FIG. 7) are driven through the registered holes 76, 78 and 46 to secure the plate 24 to the under side of the housing part 22 thereby completing the housing enclosure. The studs 80 are provided with suitable heads 82 that recess into counter bores in the plate 24 and fluted shanks that cut into the plastic material when the studs 80 are driven into place. The studs thereby fixedly secure the cover 24 to the housing part 22. Other means may be used for securing the cover plate to the housing without departing from the spirit and scope of this invention.

In assembling the cover plate 24 to the housing part 22, the bottom of the recess 74 therein engages the bottom edges of the terminal supports 70 and sockets 72 thereby to secure these in place in the housing. Thus, with the assembly of the cover plate 24, all the parts are securely fixed in position in the housing and the housing itself is permanently assembled.

As shown in FIG. 10, lug 66 is preformed at an obtuse angle with respect to pad 58. When cover 24 is secured in place, lug 66 flattens against the bottoms of notches 42, 44 thereby yieldably forcing pads 58 into intimate engagement with disc 52. This spring force is aided by the previously mentioned wedge-effect to insure firm, current-conductive contact of the pads 58 with the disc. 52.

Conventionally, two exposed connector pins are provided on the housings of split phase induction motors customarily used in refrigerators, suitable starting relays having socket type connectors conventionally fitting onto these pins. This invention provides sockets 72 having the same spacing such that the formally used relays may be removed from the motor and one of the units of this invention substituted therefor by engaging the sockets 72 with the two exposed pins. By making this installation, an electrical circuit is established as shown in FIG. 12, the resistor 52 being connected in series with the starting field winding 84.

In operation, referring to FIG. 12, upon the application of power to the motor terminals 86, assuming the resistor 52 to be at room temperature, relatively high current is drawn therethrough by the starting winding 84 thereby producing starting torque for the motor. This current causes internal heating of the resistor 52 thereby increasing the resistance which in turn reduces the current flow. When the resistance reaches a suitably high value and the starting current through the winding 84 correspondingly drops, a condition is reached at which the current flow through the winding 84 is insufficient to sustain energization which, for all practical purposes, removes the starting winding 84 from the motor circuit. The small current drawn by the starting winding 84 is, however, sufficient to maintain the resistor 52 heated and the resistance high.

It is important for the resistor 52 to cool down to starting conditions after the motor is de-energized and before the next application of power thereto. The cooling of the resistor 52 is facilitated by the particular construction of the assembly, the openings or windows 32 in the housing part 22 exposing the resistor 52 and the contact pads 58 to ambient atmosphere and the ribs 40 and the housing structure itself providing substantial area for the radiation of heat. Furthermore, the housing is given a black color to further aid in the radiation of heat energy. Thus, the parts are so sized and arranged as to dissipate the heat in the disc 52 as rapidly as possible after motor deenergization but not so rapidly as will drain off the heat during normal motor running when it is necessary to maintain the high temperature and consequent high resistance of the disc 52. During normal run operation, enough heat is retained by the resistor 52 to keep the current flowing through the starting winding 84 at the necessary low level but during motor "off" conditions, the heat-dissipating characteristics are such as to permit cool down sufficiently rapidly as to enable normal start operation of the motor.

Use of the contact ridges 64 on the pads 58 provides area contact of the pads with the resistor 52 which minimizes the chance of damaging the resistor 52 due to the relatively high "start" currents encountered. This extended area contact is to be contrasted with localized contact wherein the high start current would be limited to a small area of the resistor 52 which could cause damage thereto.

The disc 52 used in a working embodiment of this invention has a resistance characteristic shown in FIG. 13. The resistance at room temperature, 25°C, is 4.7 ohms. It is to be understood that other positive temperature coefficient resistance material may be used without departing from the spirit and scope of this invention so long as the resistance changes materially between its cold and heated conditions.

The following list of dimensions pertain to a working embodiment of the invention, it being understood that these are given by way of example only and may be varied to suit design requirements. The drawings are substantially to scale for these dimensions.

| | |
|---|---|
| Width of cover plate 24 and bottom of part 22 | 1.125 inches |
| Length of cover plate 24 and bottom of part 22 | 1.200 inches |
| Thickness of cover plate 24 | 0.200 inches |
| Height of part 22 | 1.000 inches |
| Diameter of disc 52 | 0.750 inches |
| Radius of 36 | 0.410 inches |
| Radius of curved portion of pad 58 | 0.390 inches |
| Length of leg 66 | 0.450 inches |
| Width of leg 66 | 0.250 inches |
| Angle of leg 66 with pad 58 | 20° |

While there have been described above the principles of this invention in connection with specific apparatus, it is to be clearly understood that this description is made only by way of example and not as a limitation to the scope of the invention.

What is claimed is:

1. For use in selectively energizing the starting field winding of a split phase induction motor; a positive temperature coefficient resistance device adapted to be series connected with said starting winding, said device including a housing of insulating material having a retaining cavity, a high temperature coefficient resistor disposed in said cavity having two extended area contact surfaces, two contact elements removably mounted in said housing in conductive engagement with said contact surfaces, respectively; said contact elements each including a resilient contact pad having an extended area contact surface resiliently engageable with an extended area of a respective resistor contact surface, and a terminal which projects beyond said housing; the area of contact between the contact surfaces of both said resistor and said pads providing an area current-conducting path therebetween, said cavity having opposed wall portions with said pads being juxtaposed therewith and said resistor surfaces, respectively; said housing having two heat-dissipating openings, each communicating with said cavity and being in registry, respectively, with said resistor contact surfaces, said openings being relatively large for dissipation of heat from said resistor surfaces, said pads lying between said openings and the resistor whereby heat imparted thereto by said resistor may be at least in part dissipated through said openings; and, said pads being of a size corresponding to the contact surfaces on said resistor.

2. The device of claim 1 in which the terminals of said contact elements are of the female socket type fixedly disposed in spaced apart relation and thereby adapted to be engaged with two pins of a male connector.

3. The device of claim 1 in which said resistor is of flat shape with said contact surfaces being the opposite sides thereof, said housing having said openings oppositely disposed with said pads being spaced apart by said resistor in substantial parallelism, said contact elements each further having a flat mounting lug extending substantially orthogonally from one edge portion of the respective pad, the lugs of both contact elements extending oppositely and being fixedly secured to said housing for securing said contact elements in place.

4. The device of claim 3 in which the terminals of said contact elements are elongated and spaced apart in substantial parallelism, said housing embracing said terminals to further secure them as well as said contact elements in place, said terminals extending laterally from said housing in orthogonal relation to said lugs.

5. The device of claim 4 in which said pads are substantially flat with a portion thereof offset by a small angle to provide a general radiused ridge contiguous with said resistor, said terminals lying in the general plane of the respective pads and said lugs extending substantially at right angles therefrom.

6. The device of claim 5 wherein said resistor is disc shaped and said cavity has a complementary shaped top portion to receive an edge of said resistor, said cavity wall portions being generally flat and divergent from said top portion, said pads being wedged between said wall portions and said resistor thereby to contact intimately said resistor.

7. The device of claim 6 in which said housing is in two parts, one part carrying said cavity and being enclosed except for an open bottom and said heat-dissipating openings, said open bottom being opposite said cavity top portion, grooves in said one part receiving said lugs and terminals, respectively, the other part of said housing being in the form of a cover plate secured over and closing said open bottom, said cover plate having grooves receiving said terminals, and pin-like fasteners securing said plate to said one part and also said lugs to said housing.

8. The device of claim 7 wherein said openings in said housing are elongated extending substantially from top to bottom of said one housing part.

9. The device of claim 7 wherein said housing has ribs thereon for radiating heat.

10. The device of claim 9 wherein said ribs extend along side said openings, said housing being of a phenolic resin.

11. The device of claim 7 in which said lugs normally extend at an obtuse angle from said pads so as to be forced into engagement with the bottoms of the lug-receiving grooves thereby to face yieldably said pads into engagement with said disc.

* * * * *